United States Patent
Chen et al.

(10) Patent No.: US 12,405,389 B2
(45) Date of Patent: Sep. 2, 2025

(54) SPOOFING DETECTION BASED ON ADS-B POSITIONS FROM MULTI-MODE S TRANSPONDER INTRUDERS

(71) Applicant: Honeywell International Inc., Charlotte, NC (US)

(72) Inventors: Xiaoqiang Chen, Beijing (CN); Guoqing Wang, Beijing (CN); Ruy C. Brandao, Redmond, WA (US)

(73) Assignee: Honeywell International Inc., Charlotte, NC (US)

( * ) Notice: Subject to any disclaimer, the term of this patent is extended or adjusted under 35 U.S.C. 154(b) by 129 days.

(21) Appl. No.: 18/503,874

(22) Filed: Nov. 7, 2023

(65) Prior Publication Data
US 2025/0147191 A1    May 8, 2025

(51) Int. Cl.
  *G01S 19/48*   (2010.01)
  *G01S 19/21*   (2010.01)

(52) U.S. Cl.
  CPC ............ *G01S 19/48* (2013.01); *G01S 19/215* (2013.01)

(58) Field of Classification Search
  CPC ............................... G01S 19/48; G01S 19/215
  See application file for complete search history.

(56) References Cited

U.S. PATENT DOCUMENTS

| | | | |
|---|---|---|---|
| 10,137,863 B2 | 11/2018 | Johnson | |
| 10,408,942 B2 | 9/2019 | Kim et al. | |
| 11,094,209 B1 | 8/2021 | Pham | |
| 2018/0061252 A1 | 3/2018 | Feng et al. | |
| 2018/0217266 A1 | 8/2018 | Kim et al. | |
| 2018/0272993 A1 | 9/2018 | Johnson | |
| 2023/0017616 A1* | 1/2023 | Wang | ......... H04K 3/65 |
| 2024/0201394 A1* | 6/2024 | Wang | ......... G01S 3/065 |

FOREIGN PATENT DOCUMENTS

| | | | |
|---|---|---|---|
| CN | 108521791 B | 7/2022 | |
| EP | 2511730 B1 | 10/2019 | |
| EP | 2799895 B1 | 8/2020 | |
| EP | 3989464 A1 | 4/2022 | |
| EP | 4024088 A3 | 8/2022 | |
| WO | WO-2014011264 A2 * | 1/2014 | ......... G01S 13/767 |

OTHER PUBLICATIONS

Extended Search Report from counterpart European Application No. 24206628.0 dated Mar. 25, 2025, 10 pp.
"TCAS II CAS 67A: Pilot's Guide", Honeywell, Feb. 2004, 86 pp.

* cited by examiner

*Primary Examiner* — Rodney A Butler
(74) *Attorney, Agent, or Firm* — Shumaker & Sieffert, P.A.

(57) ABSTRACT

Determine a GNSS based position malfunction and further estimate an own-ship position when determining that the GNSS position may be inaccurate. The system of this disclosure may use information either from any one or more of internal navigation systems and external information sources to determine whether a GNSS based position for the own-ship may be inaccurate and to provide a pseudo position for the own-ship as an independent position source. The system of this disclosure may determine the existence of the GNSS malfunction based on independent position information.

20 Claims, 10 Drawing Sheets

TABLE FOR GRUBB'S TEST EXAMPLE

*Alpha*

| N | 0.1 | 0.075 | 0.05 | 0.025 | 0.01 |
|---|---|---|---|---|---|
| 3 | 1.15 | 1.15 | 1.15 | 1.15 | 1.15 |
| 4 | 1.42 | 1.44 | 1.46 | 1.48 | 1.49 |
| 5 | 1.6 | 1.64 | 1.67 | 1.71 | 1.75 |
| 6 | 1.73 | 1.77 | 1.82 | 1.89 | 1.94 |
| 7 | 1.83 | 1.88 | 1.94 | 2.02 | 2.1 |
| 8 | 1.91 | 1.96 | 2.03 | 2.13 | 2.22 |
| 9 | 1.98 | 2.04 | 2.11 | 2.21 | 2.32 |
| 10 | 2.03 | 2.1 | 2.18 | 2.29 | 2.41 |
| 11 | 2.09 | 2.14 | 2.23 | 2.36 | 2.48 |
| 12 | 2.13 | 2.2 | 2.29 | 2.41 | 2.55 |
| 13 | 2.17 | 2.24 | 2.33 | 2.46 | 2.61 |
| 14 | 2.21 | 2.28 | 2.37 | 2.51 | 2.66 |
| 15 | 2.25 | 2.32 | 2.41 | 2.55 | 2.71 |
| 16 | 2.28 | 2.35 | 2.44 | 2.59 | 2.75 |
| 17 | 2.31 | 2.38 | 2.47 | 2.62 | 2.79 |

FIG. 4

SPOOFING DETECTION BASED ON ADS-B POSITIONS FROM MULTI-MODE S TRANSPONDER INTRUDERS

TECHNICAL FIELD

The disclosure relates to operation of global navigation satellite systems (GNSS) receiver systems.

BACKGROUND

Global navigation satellite systems (GNSS) are systems that may include a satellite constellation that provides positioning, navigation, and timing (PNT) services on a global or regional basis. Some examples of GNSS may include the global positioning system (GPS), Global Navigation Satellite System (GLONASS), Galileo and other similar GNSS systems. GNSS systems may be affected by intentional or unintentional interference and multi-path satellite signal reception, e.g., direct satellite signals along with the same signal reflected from a nearby building or other surface and therefore somewhat delayed. The accuracy for GNSS locations determined by an onboard receiver may depend on factors, including satellite geometry, signal blockage, atmospheric conditions, and receiver design features/quality. Some GPS receivers may include Receiver Autonomous Integrity Monitor (RAIM), which may compare distance measurements of a number of satellites, identify a satellite failure and issue an alert to the pilot.

SUMMARY

In general, the disclosure describes techniques to determine a GNSS based position malfunction and to further estimate an own-ship position when determining that the GNSS position may be inaccurate. The system of this disclosure may use information either from any one or more of internal navigation systems and external information sources to determine whether a GNSS based position for the own-ship may be inaccurate and to provide a pseudo position for the own-ship as an independent position source. The system of this disclosure may determine the existence of the GNSS malfunction based on independent position information. The GNSS malfunction may be caused by interference, spoofing, multi-path reception of satellite signals, or other causes. The independent position information may come from three or more Automatic Dependent Surveillance-Broadcast (ADS-B) aircraft reports from other aircraft, as well as a range and bearing to the other aircraft based on active RF measurements. Other examples of independent position information may also include distance measuring equipment (DME) measurements to one or more ground stations. The system may determine a level of GNSS position uncertainty, as well as generate an estimate for own-ship position based on the independent position information.

In one example, this disclosure describes a non-transitory computer-readable storage medium comprising instructions that, when executed, cause processing circuitry of a computing device for an own-ship aircraft to: receive automatic dependent surveillance-broadcast (ADS-B) reports from a plurality of aircraft; receive a traffic collision alert system transponder signal from the plurality of aircraft; calculate a pseudo-position based on a relative position of the own-ship aircraft to the plurality of aircraft based on received data comprising a reported position of each aircraft of the plurality of aircraft based on decoding each received ADS-B report from each aircraft; and a calculated range and bearing to each aircraft of the plurality of aircraft; receive broadcast signals from one or more satellites of a global navigation satellite system (GNSS); calculate a GNSS position based on the received broadcast signals; compare the GNSS position to the pseudo-position; determine whether the GNSS position is a spoofed GNSS position based on the comparison; and in response to determining that the GNSS position is spoofed, use the pseudo-position for navigation of the own-ship aircraft.

In another example, this disclosure describes a system comprising processing circuitry of a computing device, wherein the computing device is configured to be installed in an own-ship aircraft, the processing circuitry configured to: receive automatic dependent surveillance-broadcast (ADS-B) reports from a plurality of aircraft; receive a traffic collision alert system transponder signal from the plurality of aircraft; calculate a pseudo-position based on a relative position of the own-ship aircraft to the plurality of aircraft based on received data comprising a reported position of each aircraft of the plurality of aircraft based on decoding each received ADS-B report from each aircraft; and a calculated range and bearing to each aircraft of the plurality of aircraft; receive broadcast signals from one or more satellites of a global navigation satellite system (GNSS); calculate a GNSS position based on the received broadcast signals; compare the GNSS position to the pseudo-position; determine whether the GNSS position is a spoofed GNSS position based on the comparison; and in response to determining that the GNSS position is spoofed, use the pseudo-position for navigation of the own-ship aircraft.

In another example, this disclosure describes a method comprising receiving, by processing circuitry of a computing device automatic dependent surveillance-broadcast (ADS-B) reports from a plurality of aircraft, wherein the computing device is configured to be installed on an own-ship aircraft; receiving, by the processing circuitry, a traffic collision alert system transponder signal from the plurality of aircraft; calculating, by the processing circuitry, a pseudo-position based on a relative position of the own-ship aircraft to the plurality of aircraft based on received data comprising a reported position of each aircraft of the plurality of aircraft based on decoding each received ADS-B report from each aircraft; and a calculated range and bearing to each aircraft of the plurality of aircraft; receiving broadcast signals from one or more satellites of a global navigation satellite system (GNSS); calculating a GNSS position based on the received broadcast signals; comparing, by the processing circuitry, the GNSS position to the pseudo-position; determining, by the processing circuitry, whether the GNSS position is a spoofed GNSS position based on the comparison; and in response to determining that the GNSS position is spoofed, using, by the processing circuitry, the pseudo-position for navigation of the own-ship aircraft.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a Grubbs' test table illustrating an example critical value for seven data points with an alpha value of 0.1.

DETAILED DESCRIPTION

The disclosure describes determining the existence of GNSS malfunction (interference, spoofing, multi-path . . . ) by resolving own-ship position as well as its uncertainty with three or more ADS-B OUT aircraft reports as well as active RF measurements from the traffic collision avoidance system (TCAS), or other types of active surveillance systems. In addition, the DME measurements can also be used to improve the detection performance. The resolved own-ship position can alleviate the impact of loss of own-ship GNSS positions by providing the resolved position to the other onboard systems when its uncertainty is within an acceptable limit, or fusion/augmenting with other navigational equipment, e.g., the inertial navigation system (INS) installed in some vehicles. The examples in this disclosure may focus on aircraft to simplify the description, however, the techniques of this disclosure are equally applicable to other types of vehicles, such as ships or other watercraft, and land based vehicles.

Figure 1:
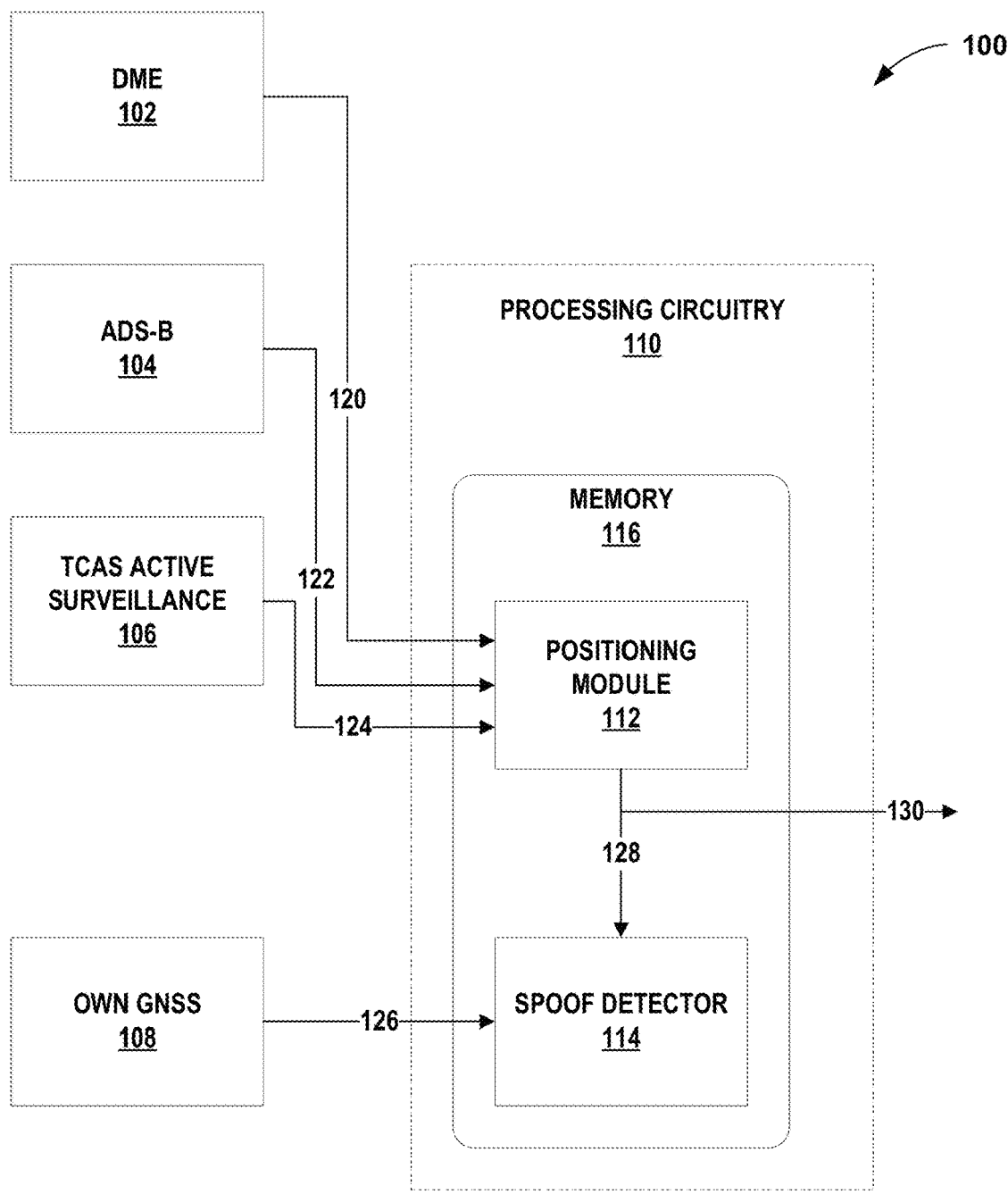
FIG. 1 is a block diagram illustrating an example system configured to detect an incorrect own-ship GNSS position based on ADS-B positions from multiple Mode S transponder intruders.

FIG. 1 is a block diagram illustrating an example system configured to detect an incorrect own-ship GNSS position based on ADS-B positions from multiple Mode S transponder intruders. In this disclosure, an "intruder" is another vehicle in the vicinity of the own-ship vehicle and may be detected by TCAS, ADS-B, radar, and other systems. System 100 in the example of FIG. 1 may determine the existence of GNSS malfunction (from interference, spoofing, multi-path, and other causes) by resolving the GNSS position uncertainty as well as determining the own-ship's position based on three or more ADS-B OUT aircraft reports and active RF measurements, e.g., from TCAS active measurements. In this disclosure, to simplify the explanation, detecting "spoofing" may be considered to include interference from intentional or unintentional causes resulting in an inaccuracy in the GNSS position.

In the example of FIG. 1, system 100 includes processing circuitry 110 that executes positioning module 112 and spoof detector 114. Positioning module 112 and spoof detector 114 may include programming instructions that, when executed, cause processing circuitry 110 to perform the GNSS malfunction detection described in this disclosure. The arrangement of FIG. 1 is just one possible example arrangement of system 100. In other examples, positioning module 112 and spoof detector 114 may each be executed by separate processing circuitry (not shown in FIG. 1) rather than by one instance of processing circuitry. In other examples, either or both of positioning module 112 and spoof detector 114 may be executed by existing processing circuitry in the avionics circuitry of the own-ship vehicle. For example, processing circuitry for the flight management system (FMS), navigation systems, and other systems (not shown in FIG. 1) may execute the programming instructions from positioning module 112 and spoof detector 114. In other examples, any of the processing circuitry for DME 102, ADS-B 104, TCAS 106, own GNSS 108 or other systems may execute all or part of the programming instructions associated with positioning module 112 and spoof detector 114. As noted above, TCAS 106 is just one example of an active surveillance system. In other examples, system 100 may include TCAS 106 along with other surveillance systems, or may include some other surveillance system for traffic awareness instead of TCAS 106. In some examples processing circuitry 110 and memory 116 may be onboard the vehicle, e.g., a fixed wing aircraft, a rotary wing aircraft, urban air mobility (UAM) vehicle, and similar vehicles. In other examples, such as unmanned aerial systems (UAS) processing circuitry 110 may be onboard the vehicle, or split between the vehicle and a ground station. In this disclosure, an "aircraft" may refer to any vehicle that may become airborne to travel from one point to another.

Examples of processing circuitry 110 may include any one or more of a microcontroller (MCU), e.g. a computer on a single integrated circuit containing a processor core, memory, and programmable input/output peripherals, a microprocessor (µP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein.

In some examples programming instructions for positioning module 112 and spoof detector 114 may be stored at one or more memory units, represented by memory 116. Examples of memory 116 may include any type of computer-readable storage media. Some examples may include random access memory (RAM), read only memory (ROM), programmable read only memory (PROM), erasable programmable read only memory (EPROM), one-time programmable (OTP) memory, electronically erasable programmable read only memory (EEPROM), flash memory, or another type of volatile or non-volatile memory device. In some examples, the computer readable storage media may also store data, such as configuration information, temporary values and other types of data used to perform the functions of this disclosure.

GNSS plays a useful role in aircraft navigation. But in some examples, GNSS may be inaccurate caused by active interference, such as spoofing or jamming or GNSS and may be affected e.g., by multipath. In some examples a GNSS satellite may broadcast slightly incorrect information that could cause a GNSS receiver position information to be incorrect and the affected GNSS receiver could provide misleading results. Accordingly an aircraft, or other vehicle, could get "false" knowledge of own-ship position in some situations. The own-ship GNSS receiver may consider the position result valid based on the GNSS internal checks, but generate incorrect output. Therefore, other aircraft systems that consume GNSS data may be unable to perform their intended function properly due to the misleading information. For example, the TCAS system uses GNSS positions in the hybrid function, and may transmit an incorrect position, speed, heading and other information to other aircraft using the TCAS system. Accordingly, the own-ship GNSS incorrect position could cause validation for other vehicles receiving the ADS-B positions to be wrong. In another example, TAWS FLTA (Forward Looking Terrain Awareness) and PDA (Premature Descent Approach) functions for commercial aircraft may rely on GNSS data as well as the built-in database for these systems. These systems may miss alerting the flight crew, or generate a nuisance alert if GNSS for the aircraft provides misleading data, which may create potential flight safety issue and service difficulty.

In some examples, processing circuitry 110 may detect GNSS abnormalities by performing the following steps. A first step may include TCAS active surveillance 106 performing multiple active surveillance requests and collecting range, bearing and/or altitude measurements based on transponder responses from intruders, e.g., other aircraft, in the vicinity of the own-ship vehicle. Active surveillance measurements 124 may contain range, bearing and altitude of an aircraft relative to the own-ship vehicle. In some conditions, bearing measurements from one or more Mode S transponders may be invalid. In some examples a Mode S transponder could also be NAR (non-altitude reporting transponder). However, the system of this disclosure may still function without a valid altitude measurement for every intruder.

Processing circuitry 110 executing position module 112 instructions may also collect corresponding ADS-B position reports 122 via ADS-B system 104, either directly from the other aircraft, or via a rebroadcast from an ADS-B ground station. Processing circuitry 110 may also receive DME slant range signals 120 from the DME station measurements when available as well as acquire corresponding geographical data for the DME stations. DME measurements are slant ranges from a DME broadcasting station and depend on a line of sight between the own-ship vehicle and the DME station. Depending on the own-ship vehicle location, any terrain, buildings, and other circumstances may block the DME signals. In the example of FIG. 1, processing circuitry 110 executing positioning module 112 may derive own-ship positioning 128 based on data from any or all of TCAS active surveillance 106, ADS-B 104 and DME 102.

Processing circuitry 110, e.g., executing spoof detector 114 may receive GNSS position information 126 from own-ship GNSS 108 and may derive the variation of above own-ship positioning based on the calculations according to positioning module 112 as compared to the own-ship position derived from GNSS satellite measurements. Finally processing circuitry 110 may detect the spoofing based on an amount of positioning variation from the comparison.

In this disclosure, measurements are defined as "complete measurements" if the measurement are based on all the components of range, bearing and altitude. Measurements that are missing one or more components are defined as non-complete measurements. In the best case, system 100 may receive "complete measurements" from all intruder transponders. In this disclosure, the worst case is that the system received only ranges from all transponders. This disclosure will focus on only the best case and worst case, because the other cases with partial data could be treated as the worst case. Note that in other examples, such as ADS-B reports, the reported position comprises latitude, longitude, and altitude. The system may calculate the range and bearing to the intruder vehicle based on own-ship position and the latitude and longitude of the intruder. The ADS-B reported altitude, or transponder altitude may be used to determine the altitude of the intruder.

The DME measurements 120 contains only slant ranges, so the DME measurements could be treated as non-complete Mode S transponder measurements. One difference is the measurement accuracy between the range measurements. So use of DME measurements 120 may only affect the implementing detail, e.g., calculating the measurement weight when using some techniques, such as the least squares calculation. In other examples, such as when system 100 receives complete measurements from the other vehicles, DME measurements 120 could also be used to improve the performance. When system 100 receives enough complete measurements, e.g., more than three complete measurements, then any additional non-complete measurements may be used to improve the performance, e.g., calculate an accurate own-ship position. Some algorithms, such as Kalman filtering, may be suitable for this scenario, and only need to apply these measurements and their accuracy information to the observation equation.

The techniques of this disclosure may have advantages over other examples of GNSS verification. In some examples of other systems, the system detects the own-ship false positioning by using the received GNSS position to determine the expected characteristics of active surveillance signals, and compare the expected characteristics to the actual received characteristics. However, such as system is dependent on knowing the own-ship known position, e.g., own GNSS position 126. When the own position is not available, the detection function does not work accurately. In addition, such a system only tells if the calculated position is false or not but is unable to provide an estimated position if the calculated position is false.

In contrast, the system of this disclosure may detect GNSS signal jamming, spoofing, and other interference without the dependence on knowing the own-ship position. In addition, in some examples, avionics equipment change, e.g., airborne equipment and/or ground equipment, may be minimized because existing avionics circuitry may be configured to execute the techniques of this disclosure. In other examples, a small stand-alone module may be added, e.g., including processing circuitry 110, positioning module 112 and spoof detector 114, in the module, but that receives other data from other devices or systems, e.g., TCAS 106 with the ability of active surveillance as well as receivers for ADS-B IN, e.g., ADS-B 104.

More importantly, the proposed technique may not only provide a solution addressing the GNSS malfunction issue, but may also provide a calculated pseudo-position 130 as an independent position source that could be directly benefit any applications and equipment that consume the GNSS positions, in a situation while in an adverse condition to GNSS functions. Also, when in range of DME equipment, the DME measurements can be considered pseudo-traffic data in the system of this disclosure.

In contrast to RAIM, the system of this disclosure is configured to detect and determine the surrounding interference signal and provide an additional position estimation. The primary purpose of RAIM is to provide a fault detection mechanism for GPS receivers. It helps identify and mitigate errors that may arise from various sources, such as satellite signal anomalies, ephemeris errors, clock inaccuracies, or atmospheric interference. By monitoring the consistency and accuracy of the GPS signals received from satellites, RAIM enables the receiver to verify the integrity of the calculated position solution. In addition GPS receivers do not interrogate, like TCAS. A GNSS receiver, like GPS, receives navigation messages broadcasted by satellites for satellites position and timing information to calculate a position of the GPS receiver. The system of this disclosure is configured to use TCAS interrogations of position reports for surrounding aircraft as well as DME measurements to estimate the own-ship position, compare to the GNSS calculated position and detect spoofing, or other interference.

Figure 2:
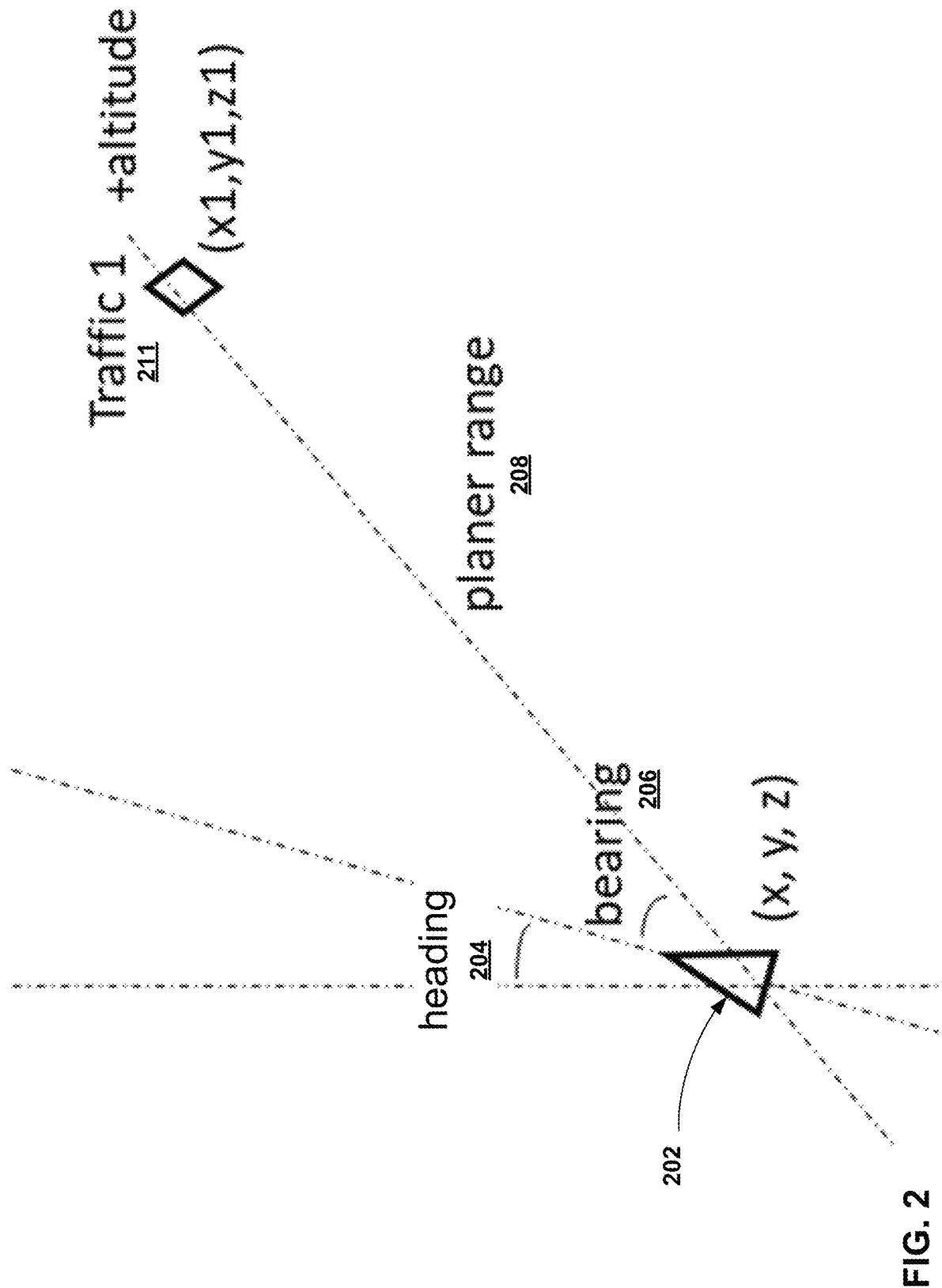
FIG. 2 is a conceptual diagram illustrating an example of receiving "complete measurements" from all intruders to detect GNSS abnormalities.

FIG. 2 is a conceptual diagram illustrating an example of receiving "complete measurements" from all intruders to detect GNSS abnormalities. The system of this disclosure may calculate a number of own-ship positions 202 based on the number of intruders available. The number of own positions 202 the system may calculate is N+1, where N is the number of ADS-B positions received by processing circuitry of the own-ship system, e.g., either onboard processing circuitry or in combination with a ground station as described above in relation to FIG. 1. The plus one is the own-ship position received by the own-ship GNSS receiver, e.g., GNSS 108 depicted in FIG. 1. In this manner the system of this disclosure may use the N+1 positions to calculate an acceptance circle, e.g., for the own-ship position.

In the example of FIG. 2, each of the N the own-ship positions 202, may be determined from the N intruders, e.g., traffic 211. Planar range 208 may be derived from the range to traffic 211 and the relative altitude between traffic 211 and the own-ship. The own-ship may travel along a heading 204 relative to north, e.g., true north or magnetic north. In the example of FIG. 2, bearing 206 to traffic 211 from the own-ship may be based on the position of traffic 211 relative to the heading 204 of the own-ship. In other examples, bearing 206 may be relative to north.

Figure 3:
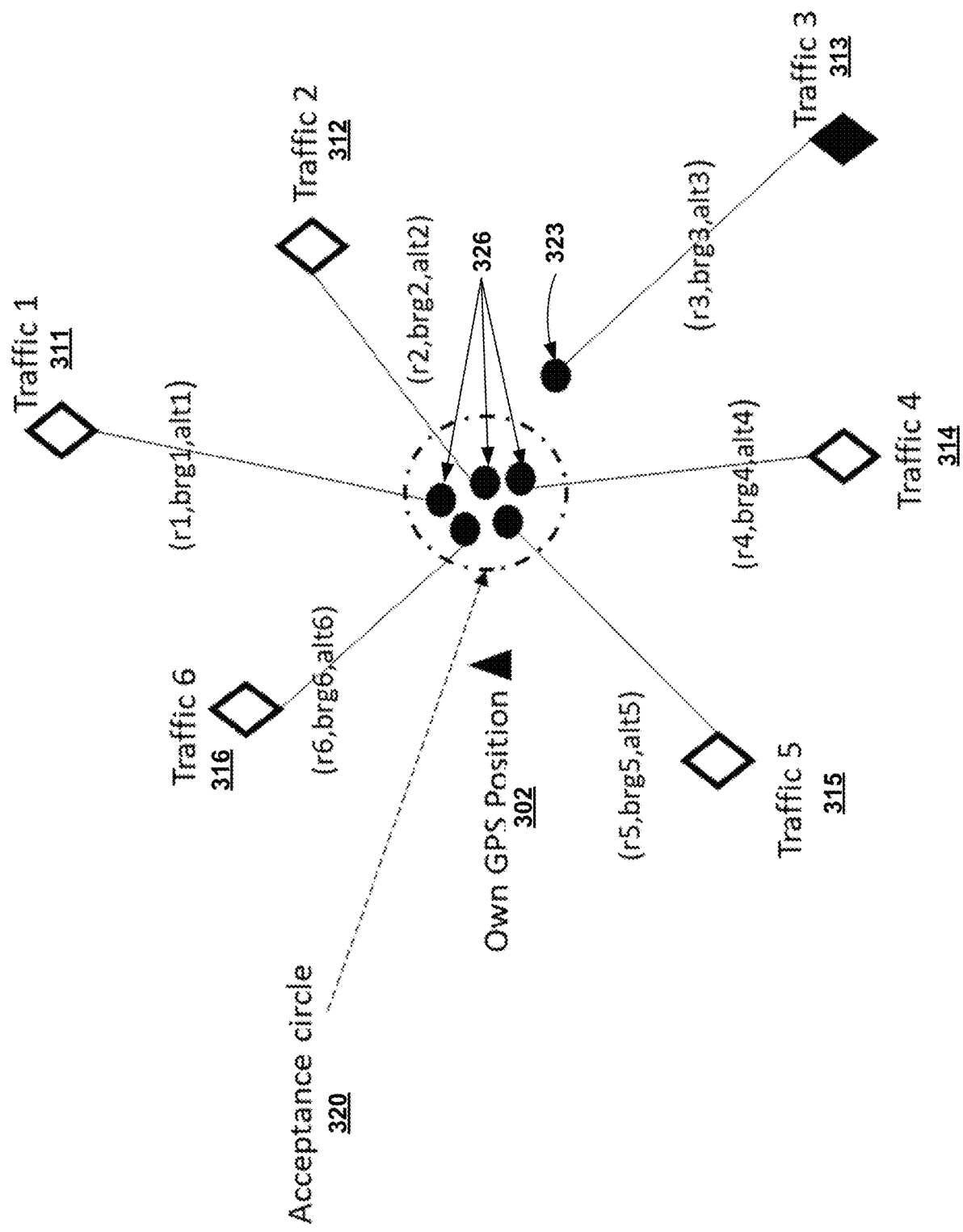
FIG. 3 is a conceptual diagram illustrating an example of receiving "complete measurements" from all intruders and performing outlier detection.

FIG. 3 is a conceptual diagram illustrating an example of receiving "complete measurements" from all intruders and performing outlier detection. As described above in relation to FIG. 2, the system of this disclosure may calculate the N own-ship positions, 323 and 326 based on complete measurements from intruders, e.g., the range, bearing and altitude each from traffic 311, 312, 313, 314, 315, and 316. The system may further determine an own-ship GNSS position, shown as own GPS position 302 in the example of FIG. 2, and compare GPS position 302 to the calculated positions 323 and 326 from the received ADS-B information and TCAS active surveillance.

To define acceptance circle 320 and perform the comparison, processing circuitry of the system of this disclosure may execute an outlier detection determination. There are several outlier detection algorithms including e.g., Z-score, Tukey's range test and Grubbs' test. The example of FIG. 3 will use the Grubbs test as the example. Grubbs test is used to find a single outlier in a normally distributed data set. The test finds if a minimum value or a maximum value is an outlier. In other examples, different tests may be used, because for example, if the data set is not normally distributed, the Grubb's test may not give accurate results and a different outlier detection technique should be used.

The example of FIG. 3, and Table 1 below, is a simulated example of received measurements from intruders, each from traffic 311, 312, 313, 314, 315, and 316. Performing Grubbs' test for the example of FIG. 3, the system would determine that the own GPS position 302 is an abnormality, e.g., spoofed, because the test value exceeds the "critical value." The critical value is value selected from the example Grubbs' table depicted in FIG. 4, e.g., item 402, which is based, for example on the number of data points in the sample. In the example of FIG. 3, the number of data points is N+1=7 data points. Note that the distance in the example of Table 1 could have been started from any point and achieve the same results. For example, if the starting point had been set as own GPS position 302, then the distance value in Table 1 for "own GNSS" would have been zero.

TABLE 1

| Example Grubbs' Table for FIG. 3 | | | |
| --- | --- | --- | --- |
| Aircraft | Distance | Test value | Detection Result |
| Own GPS | 10.9 | 1.932 | FAIL |
| Pos 1 | 17.7 | 0.044 | Pass |
| Pos 2 | 18.1 | 0.067 | Pass |
| Pos 3 | 23.2 | 1.484 | Pass |
| Pos 4 | 18.3 | 0.123 | Pass |
| Pos 5 | 18.4 | 0.151 | Pass |
| Pos 6 | 18.4 | 0.151 | Pass |

Standard deviation: 3.601
Mean: 17.857
Critical value: 1.83

In table 1, the test value for position three, traffic 313, is at 1.484, which is larger than the other calculated positions and calculated position 323 is outside of acceptance circle 320, but still less than the critical value. The test value for Grubbs' test is according to the following equation:

$$\text{Test value} = \text{abs}\left(\frac{\text{Distance} - \text{Mean}}{\text{Standard deviation}}\right)$$

In some examples, if an acceptable own aircraft pseudo-position can be determined with acceptable uncertainty (after outlier removal), the pseudo-position can also be used when own aircraft position source fails. In other words, in response to the system determining that the GNSS position is spoofed, the system may use the pseudo-position for navigation of the own-ship aircraft.

Using the pseudo-position can be useful when pseudo-position is determined with acceptable uncertainty. However, in other examples, it is possible to detect GNSS spoofing by an excessively large uncertainty of own aircraft pseudo-position solution, but the processing circuitry for the system may be unable to reach to a useable pseudo-position with small enough uncertainty after outlier processing, since aircraft in the same area are likely subject to the same spoofing as a common mode failure. In such situations, the own-ship aircraft may have to rely on other navigation systems, such as inertial navigation.

Figure 5:
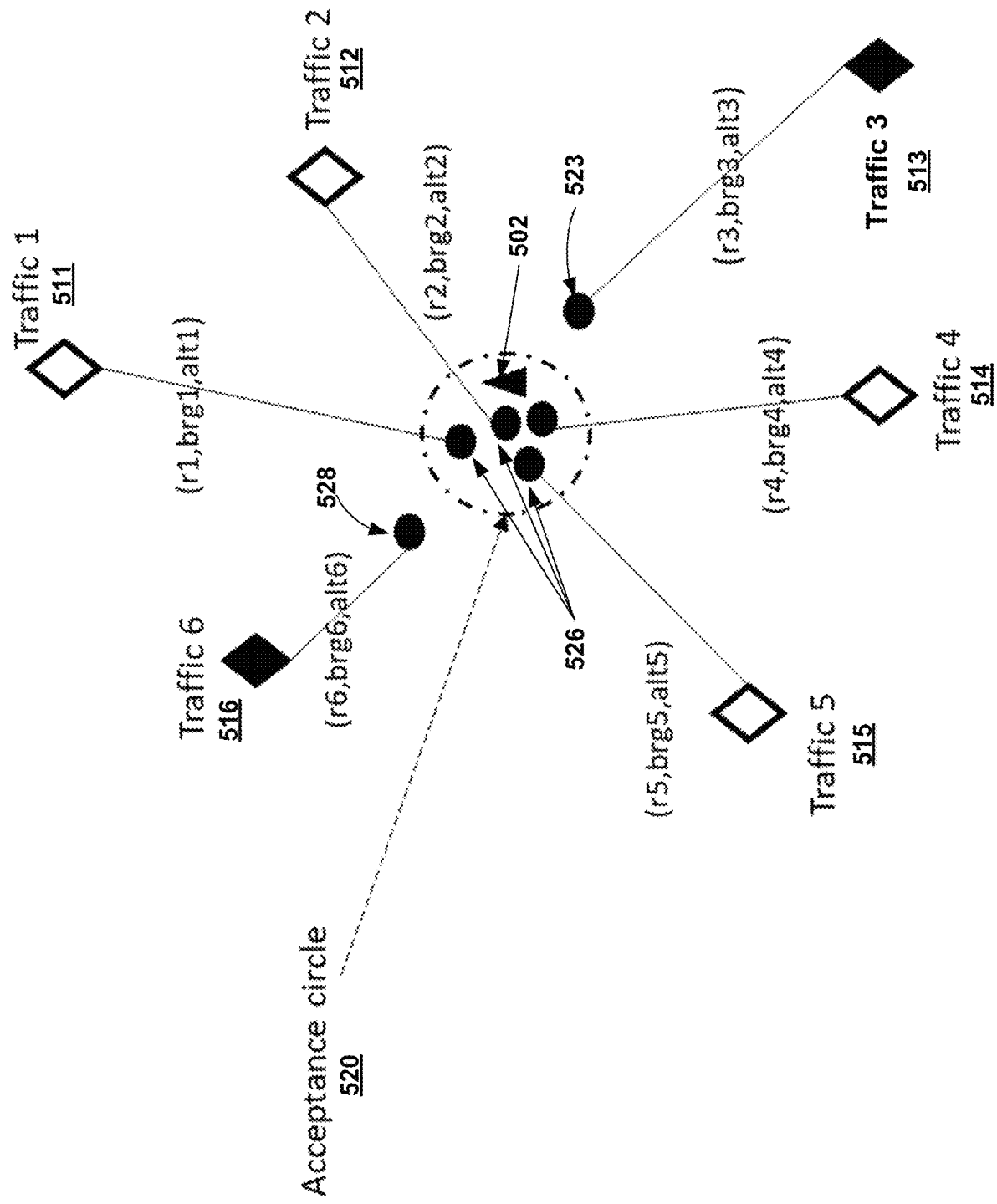
FIG. 5 is a conceptual diagram illustrating a second example of receiving complete measurements from all intruders and performing outlier detection.

FIG. 5 is a conceptual diagram illustrating a second example of receiving complete measurements from all intruders and performing outlier detection. In the example of FIG. 5, own GPS position 502 is located within acceptance circle 520. As described above in relation to FIGS. 2 and 3, the system of this disclosure may calculate the N own-ship positions, 523, 526, and 528 based on complete measurements from intruders, e.g., the range, bearing and altitude each from traffic 511, 512, 513, 514, 515, and 516. The system may further determine own GPS position 502 and compare GPS position 502 to the calculated positions 523, 526 and 528 from the received ADS-B information and TCAS active surveillance.

As listed in Table 2, own GPS position 502, based on the position from own-ship GPS receiver, is less than the critical value and within acceptance circle 520. Accordingly, the system of this disclosure would determine that own GPS position 502 is valid, e.g., not spoofed or otherwise subject to interference. The calculated position 523 from traffic 513 is listed in table 2 with a test value that exceeds the critical value. Therefore the system of this disclosure would determine that position 523 is an outlier. Similarly, calculated position 528, listed in table 2 as position 6 from traffic 516 has a test value close to one, and larger than the other calculated positions. But the test value is less than the critical value, so in the example in which the processing circuitry for the system of this disclosure used Grubbs' test for FIG. 5, the system may determine that calculated position 528 may not necessarily be an outlier.

TABLE 2

Example Grubbs' Table for FIG. 5

| Aircraft | Distance | Test value | Detection Result |
|---|---|---|---|
| Own GPS | 18.5 | 0.411 | Pass |
| Pos 1 | 17.7 | 0.801 | Pass |
| Pos 2 | 18.1 | 0.606 | Pass |
| Pos 3 | 23.2 | 1.880 | FAIL |
| Pos 4 | 18.3 | 0.508 | Pass |
| Pos 5 | 18.4 | 0.460 | Pass |
| Pos 6 | 21.2 | 0.905 | Pass | standard deviation: 2.052
Mean: 19.343
Critical value: 1.83

Figure 6:
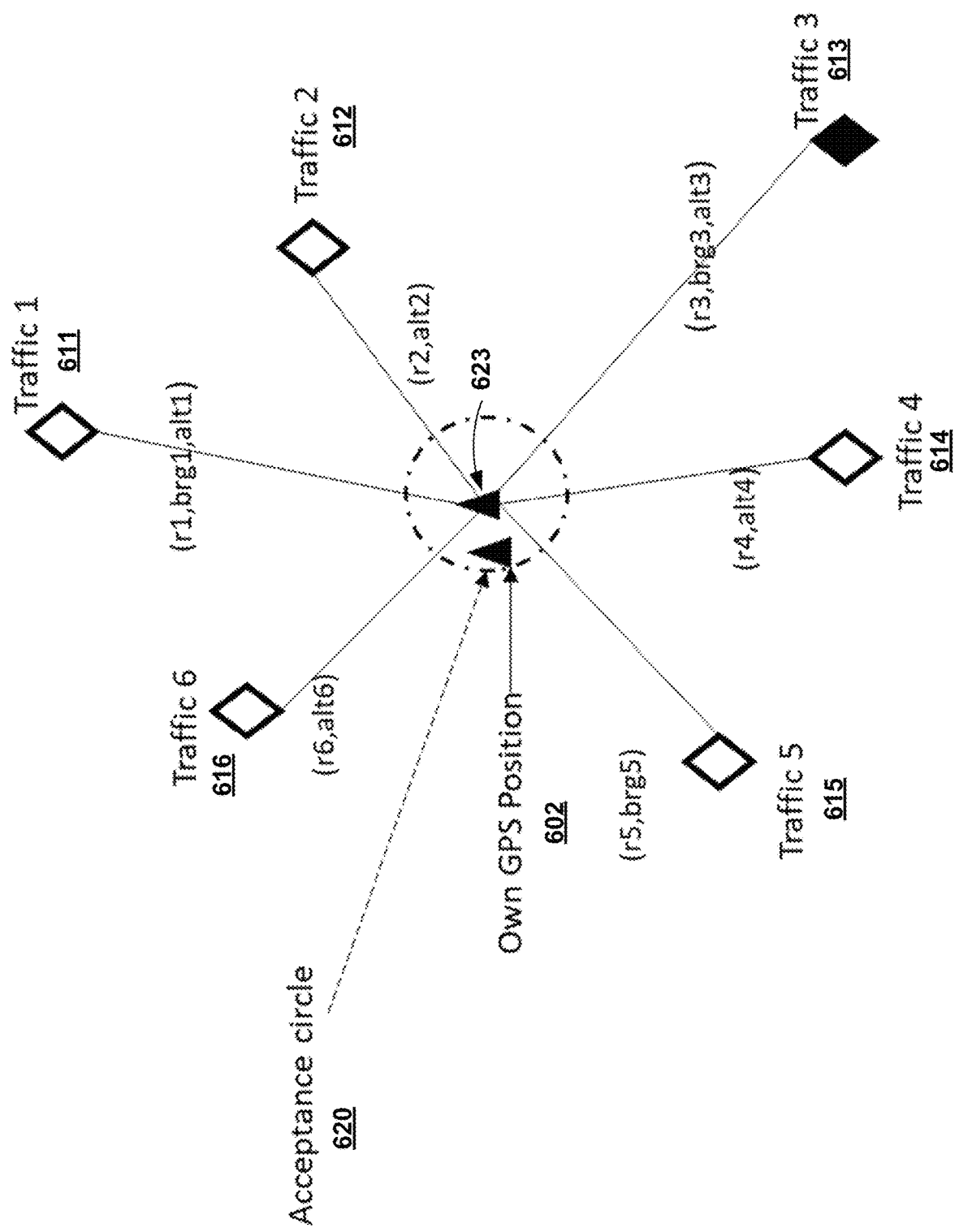
FIG. 6 is a conceptual diagram illustrating an example of receiving "non-complete measurements" from the intruders.

FIG. 6 is a conceptual diagram illustrating an example of receiving "non-complete measurements" from the intruders. Similar to the technique described above in relation to FIGS. 1-5, the system of this disclosure may calculate the estimated own-ship position 623 based on non-complete measurements from intruders, e.g., one or more of the range, bearing and altitude from traffic 611, 612, 613, 614, 615, and 616. The system may further determine own GPS position 602 compare GPS position 602 to the calculated position 623 based on the received ADS-B information, TCAS active surveillance and in some examples DME measurements.

Assuming the worst case scenario, only range measurement received from all transponders, added the received ADS-B position data, the system may calculate position 623 based on the ranges according to:

$$r_i = \sqrt[2]{(x - x_i)^2 + (y - y_i)^2 + (z - z_i)^2}$$

where:
$r_i$ is the measured range of Mode S transponder i
$(x_i, y_i, z_i)$ is the ADS-B position received from Mode S transponder i; and
(x, y, z) is the own position 623 calculated by the processing circuitry.

The range, $r_i$, is an example of slant range 120 described above in relation to FIG. 1. If the processing circuitry for the system of this disclosure, e.g., system 100 described above in relation to FIG. 1, receives three or more transponder signals, even non-complete signals as shown in FIG. 6, the processing circuitry may calculate own position 623. The processing circuitry may execute any of several different algorithms to determine own position 623. Some example algorithms may include that the range equation can be linearized and solved by least squares estimation, or apply a Kalman filter to estimate position 623.

After the processing circuitry calculates own position 623, the processing circuitry may compare the calculated position 623 with the output of the own GNSS receiver 602, as described above in relation to FIGS. 1-5. The difference may be used to tell whether the own GNSS receiver is spoofed. In some examples, the processing circuitry may also determine a level of GNSS position uncertainty and determine whether the own GNSS receiver is spoofed based on the level of position uncertainty.

In some examples, the system of this disclosure may execute a fault detection and exclusion (FDE) process to ensure that received positions are not also spoofed, or otherwise subject to interference. The FDE process may be applied to any of the examples described above, whether the system receives complete or non-complete measurements.

An FDE process may detect faults when the system receives more than the minimum, e.g., with redundant ADS-B signals. That is, when more ADS-B positions are available than needed to produce a position fix, e.g., more than 3, the extra signals should all be consistent with the computed position. A range measurement from an intruder that differs significantly from the expected position may indicate that the received ADS-B position from that intruder may not be correct, e.g., the intruder may be spoofed or affected by multipath. Range measurements that are too far different may be detected as a fault and the wrong signals from that intruder may be eliminated from the position calculation. A spoof alert threshold may depend on the accuracy of positioning, e.g., a level of uncertainty of the positioning.

Figure 7A:
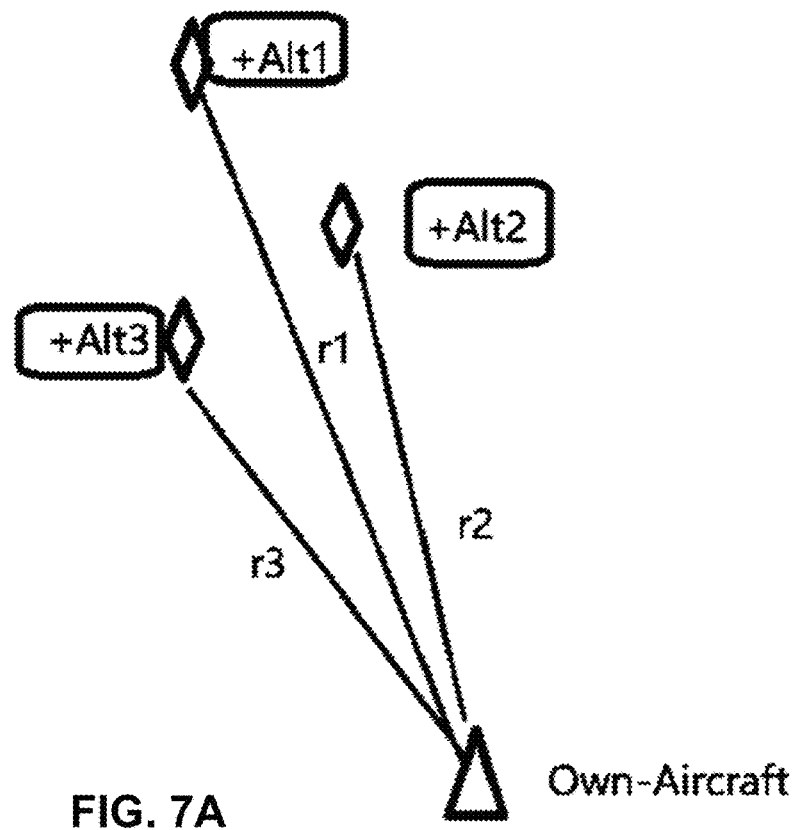
FIGS. 7A and 7B are conceptual diagrams illustrating examples of positioning error analysis.
Figure 7B:
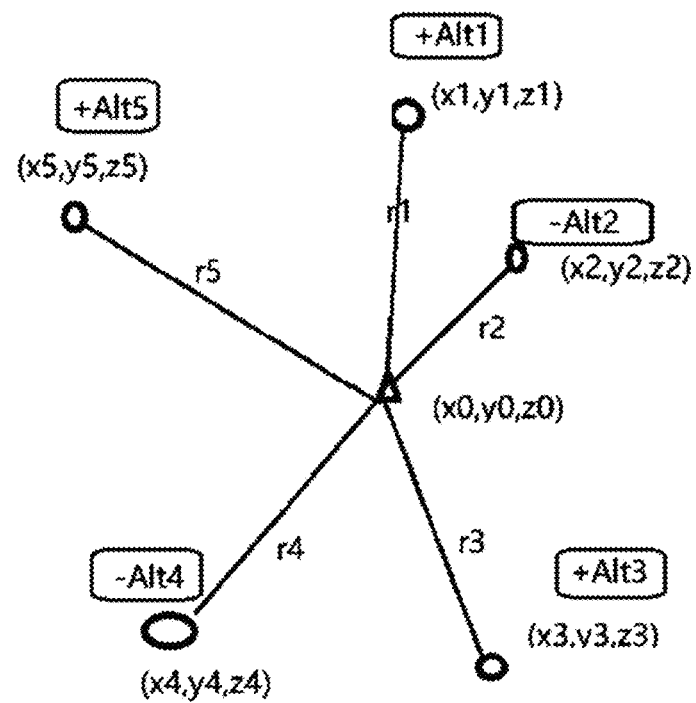

FIGS. 7A and 7B are conceptual diagrams illustrating examples of positioning error analysis. The positioning error analysis results in a determination of the accuracy of positioning and may help determine a spoof alert threshold for the processing circuitry of this disclosure. In some examples, the error analysis could provide the standard deviation for the positioning module, and to determine the spoof alert threshold may be based on the standard deviation value, e.g., Pauta criterion for outlier detection using 3-sigma as the threshold. When the processing circuitry of this disclosure receives complete measurements, the relative position of the own-ship could be expressed as the below formulas:

$$e = \sqrt{r^2 - h_r^2} * \sin(\beta + \phi)$$
$$n = \sqrt{r^2 - h_r^2} * \sin(\beta + \phi)$$
$$u = -h_r$$

where:
(e, n, u) represent the east, north and up relative position of own to traffic i;
(r, β, $h_r$) represent the measurements of range, bearing and relative altitude to traffic i; and
φ represents the heading of own-ship aircraft.

Based on the above, the standard deviation could be defined according to:

$$s_e = \sqrt{\left(\frac{r*\sin(\phi+\beta)}{\sqrt{r^2-h_r^2}}s_r\right)^2 + \left(\frac{h*\sin(\phi+\beta)}{\sqrt{r^2-h_r^2}}s_{h_r}\right)^2 + (r^2-h_r^2)\cos^2(\phi+\beta)(s_\beta^2+s_\phi^2) + s_x^2}$$

-continued $$s_n = \sqrt{\left(\frac{r*\cos(\phi+\beta)}{\sqrt{r^2-h_r^2}}s_r\right)^2 + \left(\frac{h*\cos(\phi+\beta)}{\sqrt{r^2-h_r^2}}s_{h_r}\right)^2 + (r^2-h_r^2)\sin^2(\phi+\beta)(s_\beta^2+s_\phi^2)+s_y^2}$$

$$s_u = \sqrt{s_{h_r}^2 + s_h^2}$$

where:

($s_e$, $s_n$, s_u) represent the standard deviation of (e, n, u); and ($s_r$, $s_\beta$, $s_{h_r}$) represent the standard deviation of (r, β, $h_r$).

For non-complete measurements case, the positioning error may depends on the distribution of the intruders relative to the own-ship aircraft. The calculates may therefore depend on the received Mode S transponder response received and the measurements accuracy (both range error and ADS-B positioning errors included). For certain precision ranges, the ratio of position error to the range error depends on the distribution. For good distribution, e.g., receiving ADS-B positions coming from all different directions as FIG. 7B, the ratio could be less than 1. The more clustering of the ADS-B positions, as in FIG. 7A, then the bigger the ratio may be.

The example of Table 3 below, shows the ratio of position error to the range error, also called dilution of precision (DOP) for three examples cases. Case 1 is the good distribution situation e.g., shown in FIG. 7B. Case 2 and case 3 are more like the example of FIG. 7A. For case 2 all ADS-B positions are narrowed to a ¼ bearing range of example Case 1, and in case 3 all ADS-B positions are narrowed to a ¹⁄₁₀ bearing range. In each case, the example uses five receiving ADS-B positions with added 10 degrees random error.

Dilution of precision, or geometric dilution of precision (GDOP), is a term used in satellite navigation and geomatics engineering to specify the error propagation as a mathematical effect of navigation satellite geometry on positional measurement precision. A low number for DOP indicates good distribution and higher numbers for DOP are a less desirable distribution. The same idea for satellite navigation, e.g., distribution of GNSS satellites relative to an own-ship vehicle applies to the distribution of intruders relative to the own-ship and the measurements based on received ADS-B and TCAS active surveillance. Some specific DOP measurements may include: GDOP=change in output location/changes in measured data, HDOP is a horizontal dilution of precision, VDOP is a vertical dilution of precision, PDOP may be position (3D) dilution of precision; and TDOP is time dilution of precision.

TABLE 3

DOP for different distributions

| Case | HDOP | VDOP | Horizontal Accuracy(ft) | Altitude Accuracy(ft) |
|---|---|---|---|---|
| Case 1 | 0.93766 | 4.038502 | 66.303 | 285.565 |
| Case 2 | 6.036299 | 4.333139 | 426.831 | 306.399 |
| Case 3 | 36.30122 | 7.255418 | 2566.834 | 513.036 |

For table 3, the horizontal accuracy is based on Mode S range accuracy of 50 ft RMS, and ADS-B positioning accuracy of 50 ft RMS. The altitude accuracy is based on Mode S range accuracy of 50 ft RMS, and ADS-B positioning accuracy of 50 ft RMS. The altitude is not necessary to be calculated using range. Altitude may be derived from the Mode S reported Altitude, own altitude, and ADS-B altitude.

For distributions which give a VDOP greater than 1, it means the altitude calculation error is greater than range error. Altitude from ADS-B positions and active surveillance (for altitude reporting Mode S transponder) could be used to calculate the own-ship altitude. Then, the standard deviation of the own calculated altitude may be determined according to:

$$s_u = \frac{\sqrt{n(s_{h_r}^2 + s_h^2)}}{n}$$

where n is the number of altitude reporting Mode S transponders from aircraft in the vicinity of the own-ship aircraft. For the example of Table 4 below, altitude accuracy is based on Mode S altitude accuracy of 25 ft RMS, own altitude accuracy of 25 ft RMS, receiving ADS-B altitude accuracy of 100 ft RMS.

| n | Altitude Accuracy(ft) |
|---|---|
| 1 | 106.07 |
| 2 | 75.00 |
| 3 | 61.24 |
| 5 | 47.43 |
| 6 | 43.30 |
| 7 | 40.09 |
| 8 | 37.50 |
| 9 | 35.36 |
| 10 | 33.54 |
| 11 | 31.98 |
| 12 | 30.62 |
| 13 | 29.42 |
| 14 | 28.35 |
| 15 | 27.39 |
| 16 | 26.52 |
| 17 | 25.72 |
| 18 | 25.00 |
| 19 | 24.33 |
| 20 | 23.72 |

From the error analysis, the accuracy of the pseudo altitude as in Table 4 may be good enough to be used in the own-ship spoof detection as well as an altitude source. From Table 3, the horizontal accuracy may get worse as the distribution gets narrower. So, in the worst case, with a narrow distribution of reporting aircraft, it may be desirable not to use the pseudo position as a position source. Whether the calculated pseudo-position can be used for spoofing detection may depends on how much the spoofing is. If the degree of spoofing is much greater than the position accuracy, then even in the worst case, the techniques of this disclosure may still provide detection.

Figure 8:
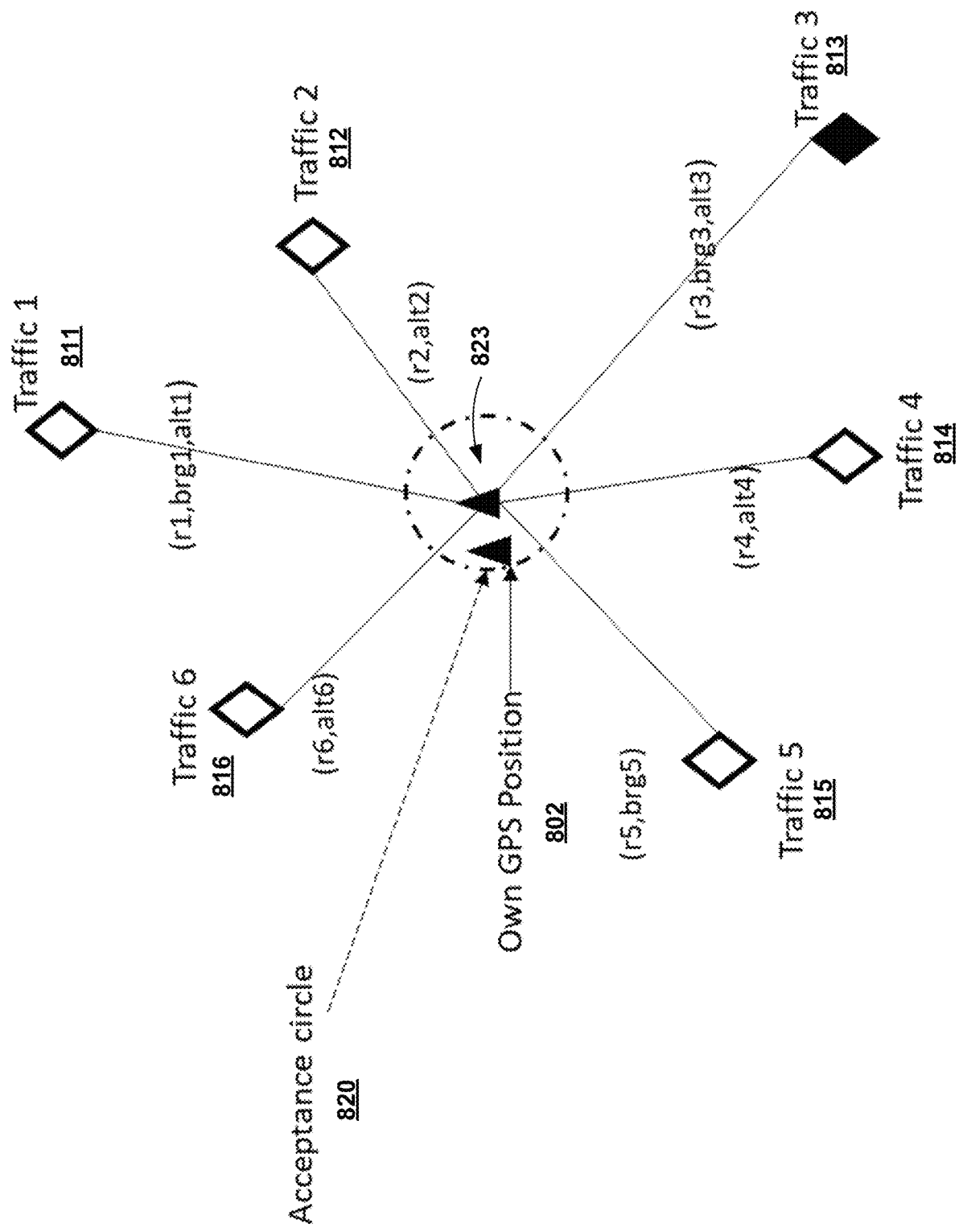
FIG. 8 is a conceptual diagram illustrating an example of receiving "non-complete measurements" and at least one inaccurate measurement from the intruders.

FIG. 8 is a conceptual diagram illustrating an example of receiving "non-complete measurements" and at least one inaccurate measurement from the intruders. As described above in relation to FIG. 3, the system of this disclosure may calculate the estimated own-ship position 823 based on non-complete measurements from traffic 811, 812, 813, 814, 815, and 816. The system may further determine own GPS position 802 compare GPS position 802 to the calculated position 823, which is based on the received ADS-B information, TCAS active surveillance and in some examples DME. measurements. As shown in FIG. 8, the Traffic 3 is identified as an inaccurate ADS-B position provider. However, with one intruder with an inaccurate ADS-B position, the method could continue to operate using other ADS-B signals, as long as there are at least three accurate ADS-B positions to calculate position 823. The example of FIG. 8 shows that the own-ship aircraft received ADS-B position signals from six intruder aircraft, and the Traffic 813 provided a wrong position. In the positioning phase, e.g., calculation performed by the processing circuitry as described above in relation to FIGS. 7A and 7B, the calculated range from Traffic 813 was identified as inaccurate, and the system determines acceptance circle 820 based on the positioning result. Own GPS position 802 is in the circle, so it is not spoofed.

Figure 9:
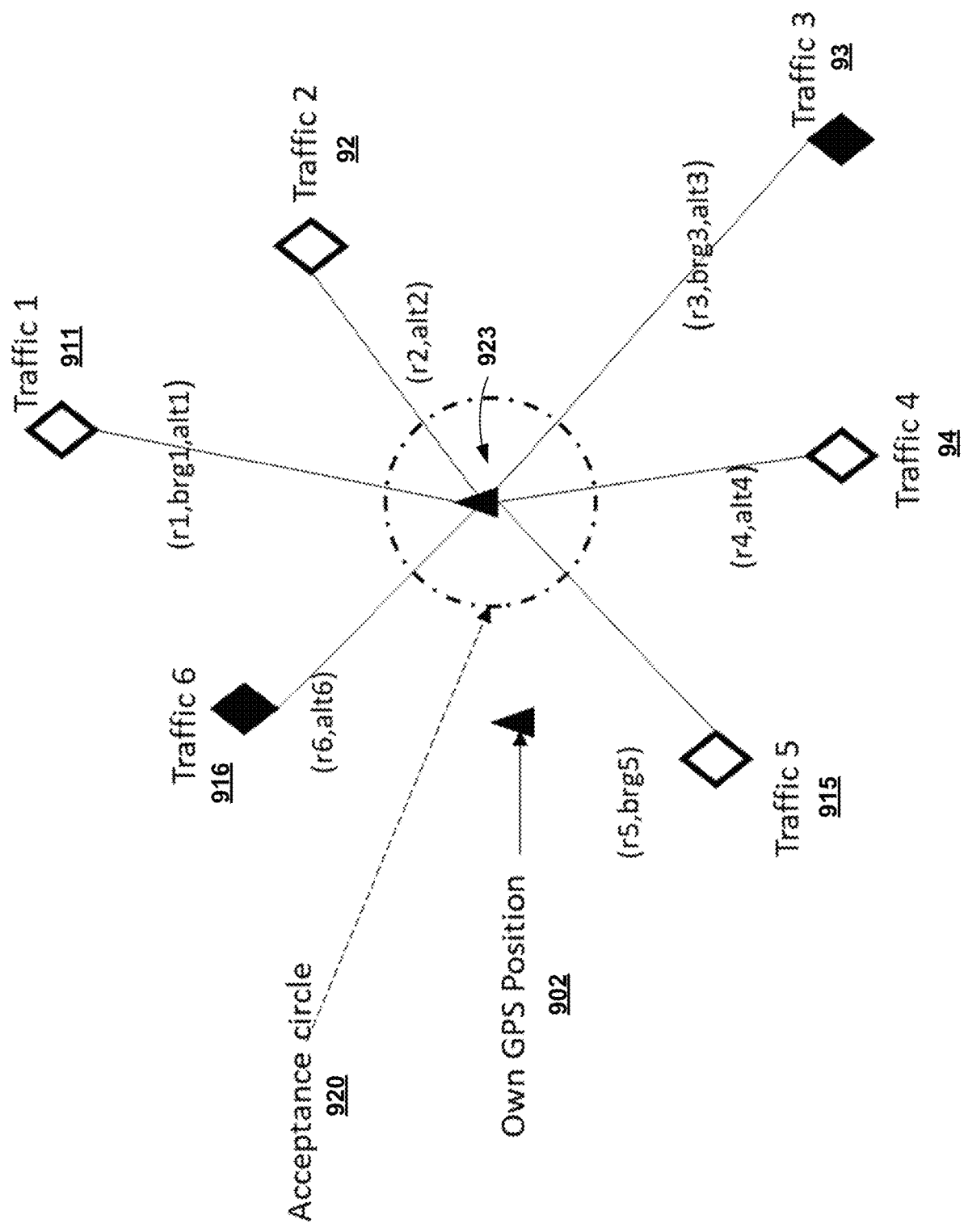
FIG. 9 is a conceptual diagram also illustrating an example of receiving "non-complete measurements" and at least one inaccurate measurement from the intruders.

FIG. 9 is a conceptual diagram also illustrating an example of receiving "non-complete measurements" and at least one inaccurate measurement from the intruders. As described above in relation to FIGS. 3 and 8, the system of this disclosure may calculate the estimated own-ship position 923 based on non-complete measurements from traffic 911, 912, 913, 914, 915, and 916. The system may further determine own GPS position 902 and compare GPS position 902 to the calculated position 923.

Similar to FIG. 8, FIG. 9 shows that the own-ship aircraft received ADS-B position signals from six aircraft, and that both Traffic 913 and Traffic 916 provided a wrong position. In the positioning phase, Traffic 913 and Traffic 916 were identified as inaccurate, and the system calculates acceptance circle 920 based on the positioning result. Own GPS position 902 is out of the circle, so the system may determine that own GPS position 902 is spoofed.

Figure 10:
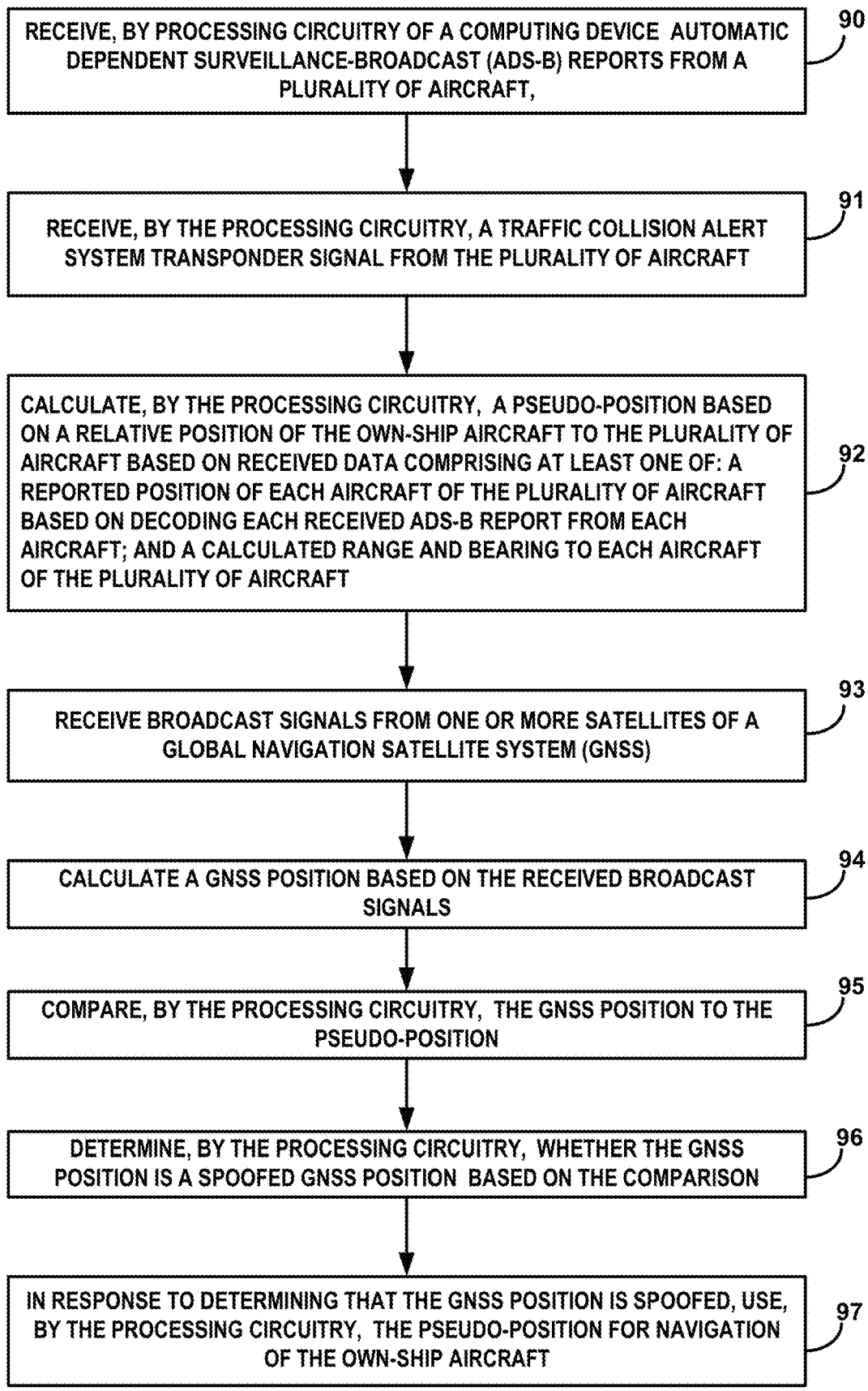
FIG. 10 is a flow chart illustrating an example operation of the GNSS error detection system of this disclosure.

FIG. 10 is a flow chart illustrating an example operation of the GNSS error detection system of this disclosure. As described above in relation to FIG. 1, the processing circuitry that performs the functions of this disclosure may be a single processor or may be distributed processing, e.g., among different avionics and/or ground equipment associated with the own-ship aircraft.

The processing circuitry of a computing device may receive ADS-B reports from a plurality of aircraft (90) as well as receive a traffic collision alert system transponder signal from the plurality of intruder aircraft (91). In some examples, such as shown in FIG. 1, processing circuitry 110 may not directly receive the ADS-B reports or the TCAS transponder signals, but rather range, bearing and altitude information from ADS-B 104 and TCAS 106 based on the transponder signals from intruder aircraft.

The processing circuitry may calculate a pseudo-position based on a relative position of the own-ship aircraft to the plurality of aircraft based on received data (92). In some examples the received data may comprise at least one of a reported position of each aircraft of the plurality of aircraft based on decoding each received ADS-B report from each aircraft; and a calculated range and bearing to each aircraft of the plurality of aircraft based on measurements by TCAS 106.

GNSS receiver, e.g., own GNSS 108 of FIG. 1, may receive broadcast signals from one or more satellites of a global navigation satellite system such as GPS (93) and calculate a GNSS position based on the received broadcast signals (94). In the example shown in FIG. 1, processing circuitry 110 may receive the calculated GNSS position and compare the GNSS position from own GNSS 108 to the calculated pseudo-position (95).

Based on the comparison, which as described above in relation to FIGS. 1-6 may include outlier analysis, the processing circuitry may determine whether the GNSS position is a spoofed GNSS position (96). As noted above, to simplify the description, "spoofed" in this context may include intentional spoofing, or other interference from multi-path, satellite errors and other causes.

In response to determining that the GNSS position is spoofed, the processing circuitry may use or output the pseudo-position 130 for navigation of the own-ship aircraft. As noted above, other avionics equipment, such as terrain awareness systems, may consume the GNSS to perform their functions.

The techniques of this disclosure may also be described in the following examples.

Example 1: A non-transitory computer-readable storage medium comprising instructions that, when executed, cause processing circuitry of a computing device for an own-ship aircraft to: receive automatic dependent surveillance-broadcast (ADS-B) reports from a plurality of aircraft; receive a traffic collision alert system transponder signal from the plurality of aircraft; calculate a pseudo-position based on a relative position of the own-ship aircraft to the plurality of aircraft based on received data comprising a reported position of each aircraft of the plurality of aircraft based on decoding each received ADS-B report from each aircraft; and a calculated range and bearing to each aircraft of the plurality of aircraft; receive broadcast signals from one or more satellites of a global navigation satellite system (GNSS); calculate a GNSS position based on the received broadcast signals; compare the GNSS position to the pseudo-position; determine whether the GNSS position is a spoofed GNSS position based on the comparison; and in response to determining that the GNSS position is spoofed, use the pseudo-position for navigation of the own-ship aircraft.

Example 2: The non-transitory computer-readable storage medium of example 1, further comprising instructions for causing the processing circuitry to: receive an indication of slant range to one or more distance measuring equipment (DME) transmitters, and calculate the pseudo-position also based on the indication of the slant range to the one or more DME transmitters.

Example 3: The non-transitory computer-readable storage medium of any of examples 1 and 2, wherein the reported position comprises range, bearing and altitude relative to the own-ship aircraft; and wherein to calculate the pseudo-position comprises to calculate a complete measurement for a respective estimated own-ship position based on the reported position for a respective aircraft of the plurality of aircraft.

Example 4: The non-transitory computer-readable storage medium of example 3, wherein the comparison comprises outlier detection of each respective estimated own-ship position and the GNSS position.

Example 5: The non-transitory computer-readable storage medium of any of examples 1 through 4, wherein the reported position comprises at least a range relative to the own-ship aircraft; and wherein to calculate the pseudo-position comprises to calculate a non-complete measurement for an estimated own-ship position based on the reported position.

Example 6: The non-transitory computer-readable storage medium of any of examples 1 through 5, wherein the instructions to calculate the pseudo-position comprise a fault detection and exclusion (FDE) process comprising calculate the pseudo-position based the received data from more than three aircraft; determine whether a respective range from a respective aircraft differs from the calculated pseudo-position by more than a spoof alert threshold; and in response to determining that the respective range from the respective aircraft differs by more than the spoof alert threshold, determine that the respective range is a fault range and exclude the respective range from the calculation for the pseudo-position.

Example 7: The non-transitory computer-readable storage medium of any of examples 1 through 6, wherein the instructions cause the processing circuitry to calculate a pseudo-altitude based on the received data.

Example 8: A system comprising processing circuitry of a computing device, wherein the computing device is configured to be installed in an own-ship aircraft, the processing circuitry configured to: receive automatic dependent surveillance-broadcast (ADS-B) reports from a plurality of aircraft; receive a traffic collision alert system transponder signal from the plurality of aircraft; calculate a pseudo-position based on a relative position of the own-ship aircraft to the plurality of aircraft based on received data comprising a reported position of each aircraft of the plurality of aircraft based on decoding each received ADS-B report from each aircraft; and a calculated range and bearing to each aircraft of the plurality of aircraft; receive broadcast signals from one or more satellites of a global navigation satellite system (GNSS); calculate a GNSS position based on the received broadcast signals; compare the GNSS position to the pseudo-position; determine whether the GNSS position is a spoofed GNSS position based on the comparison; and in response to determining that the GNSS position is spoofed, use the pseudo-position for navigation of the own-ship aircraft.

Example 9: The system of example 8, wherein the processing circuitry is further configured to: receive an indication of slant range to one or more distance measuring equipment (DME) transmitters, calculate the pseudo-position also based on the indication of the slant range to the one or more DME transmitters.

Example 10: The system of any of examples 8 and 9, wherein the reported position comprises range, bearing and altitude relative to the own-ship aircraft; and wherein to calculate the pseudo-position comprises to calculate a complete measurement for a respective estimated own-ship position based on the reported position for a respective aircraft of the plurality of aircraft.

Example 11: The system of example 10, wherein the comparison comprises outlier detection of each respective estimated own-ship position and the GNSS position.

Example 12: The system of any of examples 8 through 11, wherein the reported position comprises at least a range relative to the own-ship aircraft; and wherein to calculate the pseudo-position comprises to calculate a non-complete measurement for an estimated own-ship position based on the reported position.

Example 13: The system of any of examples 8 through 12, wherein the instructions to calculate the pseudo-position comprise a fault detection and exclusion (FDE) process comprising calculate the pseudo-position based the received data from more than three aircraft; determine whether a respective range from a respective aircraft differs from the calculated pseudo-position by more than a spoof alert threshold; and in response to determining that the respective range from the respective aircraft differs by more than the spoof alert threshold, determine that the respective range is a fault range and exclude the respective range from the calculation for the pseudo-position.

Example 14: The system of any of examples 8 through 13, wherein the instructions cause the processing circuitry to calculate a pseudo-altitude based on the received data.

Example 15: A method comprising receiving, by processing circuitry of a computing device automatic dependent surveillance-broadcast (ADS-B) reports from a plurality of aircraft, wherein the computing device is configured to be installed on an own-ship aircraft; receiving, by the processing circuitry, a traffic collision alert system transponder signal from the plurality of aircraft; calculating, by the processing circuitry, a pseudo-position based on a relative position of the own-ship aircraft to the plurality of aircraft based on received data comprising a reported position of each aircraft of the plurality of aircraft based on decoding each received ADS-B report from each aircraft; and a calculated range and bearing to each aircraft of the plurality of aircraft; receiving broadcast signals from one or more satellites of a global navigation satellite system (GNSS); calculating a GNSS position based on the received broadcast signals; comparing, by the processing circuitry, the GNSS position to the pseudo-position; determining, by the processing circuitry, whether the GNSS position is a spoofed GNSS position based on the comparison; and in response to determining that the GNSS position is spoofed, using, by the processing circuitry, the pseudo-position for navigation of the own-ship aircraft.

Example 16: The method of example 15, further comprising receiving an indication of slant range to one or more distance measuring equipment (DME) transmitters, calculating the pseudo-position also based on the indication of the slant range to the one or more DME transmitters.

Example 17: The method of any of examples 15 and 16, wherein the reported position comprises range, bearing and altitude relative to the own-ship aircraft; wherein calculating the pseudo-position further comprises calculating a complete measurement for a respective estimated own-ship position based on the reported position for a respective aircraft of the plurality of aircraft.

Example 18: The method of any of examples 15 through 17, wherein the comparison comprises outlier detection of each respective estimated own-ship position and the GNSS position.

Example 19: The method of any of examples 15 through 18, wherein the reported position comprises at least a range relative to the own-ship aircraft; wherein calculating the pseudo-position comprises calculating a non-complete measurement for an estimated own-ship position based on the reported position.

Example 20: The method of any of examples 15 through 19, wherein calculating the pseudo-position comprise a fault detection and exclusion (FDE) process comprising calculating the pseudo-position based the received data from more than three aircraft; and determining whether a respective range from a respective aircraft differs from the calculated pseudo-position by more than a spoof alert threshold; in response to determining that the respective range from the respective aircraft differs by more than the spoof alert threshold, determine that the respective range is a fault range and exclude the respective range from the calculation for the pseudo-position.

In one or more examples, the functions described above may be implemented in hardware, software, firmware, or any combination thereof. For example, the various components of FIG. 1, such as processing circuitry 110, DME 102, ADS-B 104, TCAS 106, and GNSS 108 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" and "processing circuitry," as used herein, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. These and other examples are within the scope of the following claims.

What is claimed is:

1. A non-transitory computer-readable storage medium comprising instructions that, when executed, cause processing circuitry of a computing device for an own-ship aircraft to:
receive automatic dependent surveillance-broadcast (ADS-B) position reports from a plurality of aircraft;
receive active surveillance signals from the plurality of aircraft;
calculate a pseudo-position based on a relative position of the own-ship aircraft to the plurality of aircraft based on received data comprising at least one of:
a reported position of each aircraft of the plurality of aircraft based on decoding each received ADS-B report from each aircraft; and
a calculated range and bearing to each aircraft of the plurality of aircraft based on the active surveillance signals;
receive broadcast signals from one or more satellites of a global navigation satellite system (GNSS);
calculate a GNSS position based on the received broadcast signals;
determine whether the GNSS position is a spoofed GNSS position based on at least a comparison of the GNSS position to the pseudo-position and a level of uncertainty of the calculated GNSS position; and
in response to determining that the GNSS position is spoofed, use the pseudo-position for navigation of the own-ship aircraft.

2. The non-transitory computer-readable storage medium of claim 1, further comprising instructions for causing the processing circuitry to:
receive an indication of slant range to one or more distance measuring equipment (DME) transmitters, and
calculate the pseudo-position also based on the indication of the slant range to the one or more DME transmitters.

3. The non-transitory computer-readable storage medium of claim 1,
wherein the reported position comprises range, bearing and altitude relative to the own-ship aircraft; and
wherein to calculate the pseudo-position, the instructions cause the processing circuitry to calculate a complete measurement for a respective estimated own-ship position based on the reported position for a respective aircraft of the plurality of aircraft.

4. The non-transitory computer-readable storage medium of claim 3, wherein to perform the comparison of the GNSS position to the pseudo-position, the instructions cause the processing circuitry to perform outlier detection of each respective estimated own-ship position and the GNSS position.

5. The non-transitory computer-readable storage medium of claim 1,
wherein the reported position comprises at least a range relative to the own-ship aircraft; and
wherein to calculate the pseudo-position, the instructions cause the processing circuitry to calculate a non-complete measurement for an estimated own-ship position based on the reported position.

6. The non-transitory computer-readable storage medium of claim 1, wherein to calculate the pseudo-position, the instructions cause the processing circuitry to perform a fault detection and exclusion (FDE) process, the FDE comprising:
calculating the pseudo-position based the received data from more than three aircraft;

determining whether a respective range from a respective aircraft differs from the calculated pseudo-position by more than a spoof alert threshold; and in response to determining that the respective range from the respective aircraft differs by more than the spoof alert threshold, determining that the respective range is a fault range and exclude the respective range from the calculation for the pseudo-position.

7. The non-transitory computer-readable storage medium of claim 1, wherein the instructions cause the processing circuitry to calculate a pseudo-altitude based on the received data.

8. A system comprising:
an automatic dependent surveillance-broadcast (ADS-B) receiver;
an active surveillance system;
processing circuitry of a computing device, wherein the computing device is configured to be installed in an own-ship aircraft, the processing circuitry configured to:
receive reports from a plurality of aircraft from the ADS-B receiver;
receive TCAS transponder signals from the plurality of aircraft via the TCAS;
calculate a pseudo-position based on a relative position of the own-ship aircraft to the plurality of aircraft based on received data comprising:
a reported position of each aircraft of the plurality of aircraft based on decoding each received ADS-B report from each aircraft; and
a calculated range and bearing to each aircraft of the plurality of aircraft based on the TCAS transponder signals;
receive broadcast signals from one or more satellites of a global navigation satellite system (GNSS);
calculate a GNSS position based on the received broadcast signals;
determine whether the GNSS position is a spoofed GNSS position based on a comparison of the GNSS position to the pseudo-position; and
in response to determining that the GNSS position is spoofed, use the pseudo-position for navigation of the own-ship aircraft.

9. The system of claim 8, wherein the processing circuitry is further configured to:
receive an indication of slant range to one or more distance measuring equipment (DME) transmitters,
calculate the pseudo-position also based on the indication of the slant range to the one or more DME transmitters.

10. The system of claim 8,
wherein the reported position comprises range, bearing and altitude relative to the own-ship aircraft; and
wherein to calculate the pseudo-position comprises to calculate a complete measurement for a respective estimated own-ship position based on the reported position for a respective aircraft of the plurality of aircraft.

11. The system of claim 10, wherein the comparison comprises outlier detection of each respective estimated own-ship position and the GNSS position.

12. The system of claim 8,
wherein the reported position comprises at least a range relative to the own-ship aircraft; and
wherein to calculate the pseudo-position comprises to calculate a non-complete measurement for an estimated own-ship position based on the reported position.

13. The system of claim 8, wherein to calculate the pseudo-position, the processing circuitry executes a fault detection and exclusion (FDE) process, the FDE comprising:
calculating the pseudo-position based the received data from more than three aircraft;
determining whether a respective range from a respective aircraft differs from the calculated pseudo-position by more than a spoof alert threshold; and
in response to determining that the respective range from the respective aircraft differs by more than the spoof alert threshold, determining that the respective range is a fault range and exclude the respective range from the calculation for the pseudo-position.

14. The system of claim 8, wherein the processing circuitry is configured to calculate a pseudo-altitude based on the received data.

15. A method comprising:
receiving, by processing circuitry of a computing device automatic dependent surveillance-broadcast (ADS-B) reports from a plurality of aircraft, wherein the computing device is configured to be installed on an own-ship aircraft;
receiving, by the processing circuitry, a traffic collision alert system (TCAS) transponder signal from the plurality of aircraft;
calculating, by the processing circuitry, a pseudo-position based on a relative position of the own-ship aircraft to the plurality of aircraft based on received data comprising at least one of:
a reported position of each aircraft of the plurality of aircraft based on decoding each received ADS-B report from each aircraft; and
a calculated range and bearing to each aircraft of the plurality of aircraft based on the TCAS transponder signals;
receiving broadcast signals from one or more satellites of a global navigation satellite system (GNSS);
calculating a GNSS position based on the received broadcast signals;
comparing, by the processing circuitry, the GNSS position to the pseudo-position;
determining, by the processing circuitry, whether the GNSS position is a spoofed GNSS position based on the comparison; and
in response to determining that the GNSS position is spoofed, using, by the processing circuitry, the pseudo-position for navigation of the own-ship aircraft.

16. The method of claim 15, further comprising:
receiving an indication of slant range to one or more distance measuring equipment (DME) transmitters,
calculating the pseudo-position also based on the indication of the slant range to the one or more DME transmitters.

17. The method of claim 15,
wherein the reported position comprises range, bearing and altitude relative to the own-ship aircraft;
wherein calculating the pseudo-position further comprises calculating a complete measurement for a respective estimated own-ship position based on the reported position for a respective aircraft of the plurality of aircraft.

18. The method of claim 15, wherein the comparison comprises outlier detection of each respective estimated own-ship position and the GNSS position.

19. The method of claim 15,
wherein the reported position comprises at least a range relative to the own-ship aircraft;
wherein calculating the pseudo-position comprises calculating a non-complete measurement for an estimated own-ship position based on the reported position.

20. The method of claim 15, wherein calculating the pseudo-position comprise a fault detection and exclusion (FDE) process, the FDE comprising:
calculating the pseudo-position based the received data from more than three aircraft; and
determining whether a respective range from a respective aircraft differs from the calculated pseudo-position by more than a spoof alert threshold;
in response to determining that the respective range from the respective aircraft differs by more than the spoof alert threshold, determine that the respective range is a fault range and exclude the respective range from the calculation for the pseudo-position.

* * * * *